UNITED STATES PATENT OFFICE.

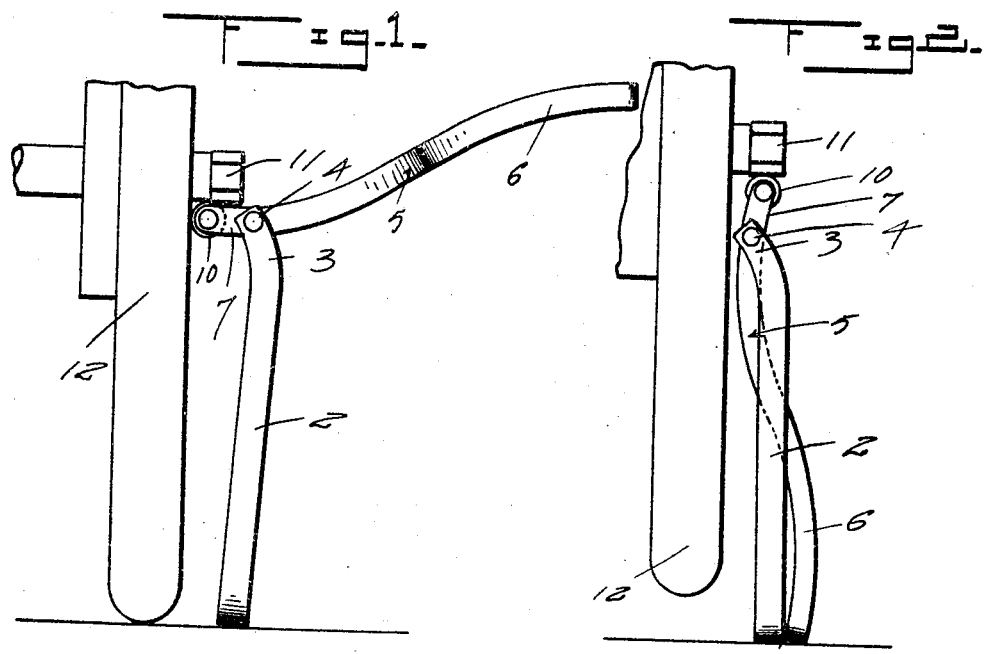
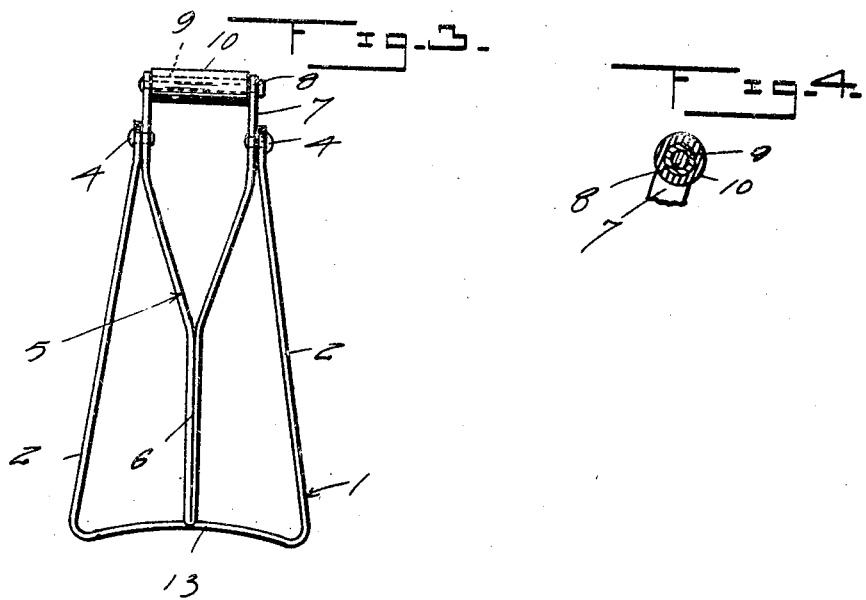

AARON ALEXANDER, OF NEWFIELD, NEW YORK.

AUTOMOBILE-JACK.

1,354,529.   Specification of Letters Patent.   Patented Oct. 5, 1920.

Application filed November 7, 1917. Serial No. 200,742.

*To all whom it may concern:*

Be it known that I, AARON ALEXANDER, a citizen of the United States, residing at Newfield, in the county of Tompkins and State of New York, have invented certain new and useful Improvements in Automobile-Jacks; and I do hereby declare the following to be a full, clear, and exact description of the invention, such as will enable others skilled in the art to which it appertains to make and use the same.

This invention relates to improvements in an automobile jack and has for one of its objects the provision of a device of this character employing a supporting structure having pivoted thereto, an operating lever provided with a hub or axle engaging member, that is adapted to be positioned under the hub or the axle so that upon downward movement of the operating handle or lever, the axle or hub will be elevated and supported by the supporting structure.

Another object of this invention is the provision of the base curved for the purpose of performing a stop to limit the movement of the operating handle or lever when the hub or axle has been elevated to prevent the hub or axle engaging member from passing beyond its pivot so that the hub or axle will be supported in elevated position.

A further object of this invention is the provision of an automobile jack of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:

Figure 1 is a side elevation of an automobile jack constructed in accordance with my invention, illustrating it being applied to the hub of a wheel, Fig. 2 is a similar view illustrating a wheel elevated by the jack, Fig. 3 is a front elevation of the jack, Fig. 4 is a detail sectional view illustrating the hub or axle engaging member.

Referring in detail to the drawing, the numeral 1 indicates as an entirety, a substantially U-shaped supporting structure having the free ends of its arm portions 2 curved as at 3 and apertured to receive bolts 4, which pivotally supports an operating lever 5. The operating lever 5 is constructed from a single length of material, which is bent upon itself to form a handle 6, the ends of which diverge and extend parallel to form relatively spaced arms 7. The relatively spaced arms 7 are slightly curved and apertured adjacent their free ends to receive the bolts 4, whereby the lever 5 is pivotally connected to the supporting structure 1. The free ends of the arms 7 are apertured to receive a bolt 8 on which is positioned, a collar 9. The collar 9 rotatably supports a roller 10, which roller is adapted to engage under the hub 11 of a wheel 12 as clearly shown in Figs. 1 and 2.

The web portion of the substantially U-shaped supporting structure 1 is curved to form a stop 13, which is adapted to be engaged by the free end of the handle 6 when the operating lever 5 is swung downwardly, thus limiting the movement of the operating lever 5 so as to prevent the roller 10 from passing beyond the pivot of the operating lever 5 of the supporting structure 1, and preventing the operating lever 5 from moving upwardly when supporting the wheel in an elevated position.

In operation, the supporting structure 1 is positioned along side of the wheel 12 as shown in Fig. 1 having the operating lever 5 raised so as to permit the roller 10 to be positioned under the hub 11 and by pushing downwardly upon the handle 6, until it engages the stop 13, the wheel 12 will be elevated as shown in Fig. 2 and supported in this position owing to the roller 10 being disposed beyond the pivot of the operating lever 5 and the handle 6 engaging the stop 13.

While I have shown and described the preferred embodiment of my invention, it will be understood that minor changes in construction, combination and arrangement of parts may be made without departing from the spirit and scope of the invention as claimed.

Having thus described my invention, what I claim is:

A jack comprising a substantially U-shaped supporting frame adapted to have its web portion positioned on the ground to support the arms vertically, said arms converge from the web portion and have their free ends curved laterally of said web portion and adapted to be positioned in close proximity to a wheel, a lever constructed from a single length of material bent to form parallel and converging portions and a handle and said parallel portions being relatively spaced and pivoted to the lateral ends of the arms, and a roller journaled to the spaced parallel portions and adapted to engage the hub of a wheel, said lever having a compound curve throughout its length so as to dispose the handle portion on an opposite side of the frame from the spaced parallel portions and to position the roller in vertical alinement with the pivot between the lever and the frame when said handle is in engagement with the web portion, said web portion being curved to act as a stop for the lever.

In testimony whereof I affix my signature in presence of two witnesses.

AARON ALEXANDER.

Witnesses:
 JOHN C. THOMPSON,
 FRED W. PAYNE.